United States Patent [19]
Porter

[11] Patent Number: 5,097,705
[45] Date of Patent: Mar. 24, 1992

[54] GAUGE PROTECTOR

[76] Inventor: Stuart J. Porter, 2181 Mill Rd., Novato, Calif. 94947

[21] Appl. No.: 529,159

[22] Filed: May 25, 1990

[51] Int. Cl.⁵ .............................................. G01D 11/24
[52] U.S. Cl. .................................... 73/431; 73/865.1; 359/808
[58] Field of Search ............... 73/865.1, 431; 350/242, 350/243, 580

[56] References Cited

U.S. PATENT DOCUMENTS

| | | | |
|---|---|---|---|
| Re. 33,311 | 8/1990 | Wilkins | 351/41 |
| 1,175,274 | 3/1916 | Klorer | 350/243 X |
| 3,530,723 | 9/1970 | Hogue et al. | 73/431 |
| 3,659,471 | 5/1972 | Ostrowski | 73/431 |
| 3,872,731 | 3/1975 | Borom et al. | 73/865.1 |
| 3,888,127 | 6/1975 | Shamlian et al. | 73/431 |
| 4,055,141 | 10/1977 | Homs | 73/431 X |
| 4,123,375 | 11/1978 | Bull et al. | 350/580 |
| 4,466,283 | 8/1984 | Osterhout et al. | 73/865.1 X |
| 4,729,649 | 3/1988 | Thompson | 350/580 X |
| 4,736,924 | 4/1988 | Bednar | 248/558 |

FOREIGN PATENT DOCUMENTS 1008689   3/1983   U.S.S.R. .............................. 350/580

Primary Examiner—Tom Noland
Attorney, Agent, or Firm—Larry D. Johnson

[57] ABSTRACT

A gauge protector provides a shield device for the protection of the lenses of skin diving gauges and related articles. The device comprises one or more crossbar elements extending between crossbar base portions, of a size and shape to fit over the gauge lens, and is releasably captured between the dive gauge body and its associated flexible protective boot member. The crossbar base portions preferably include downwardly-extending peripheral flange portions for releasable capture of the sides of the gauge body.

6 Claims, 4 Drawing Sheets

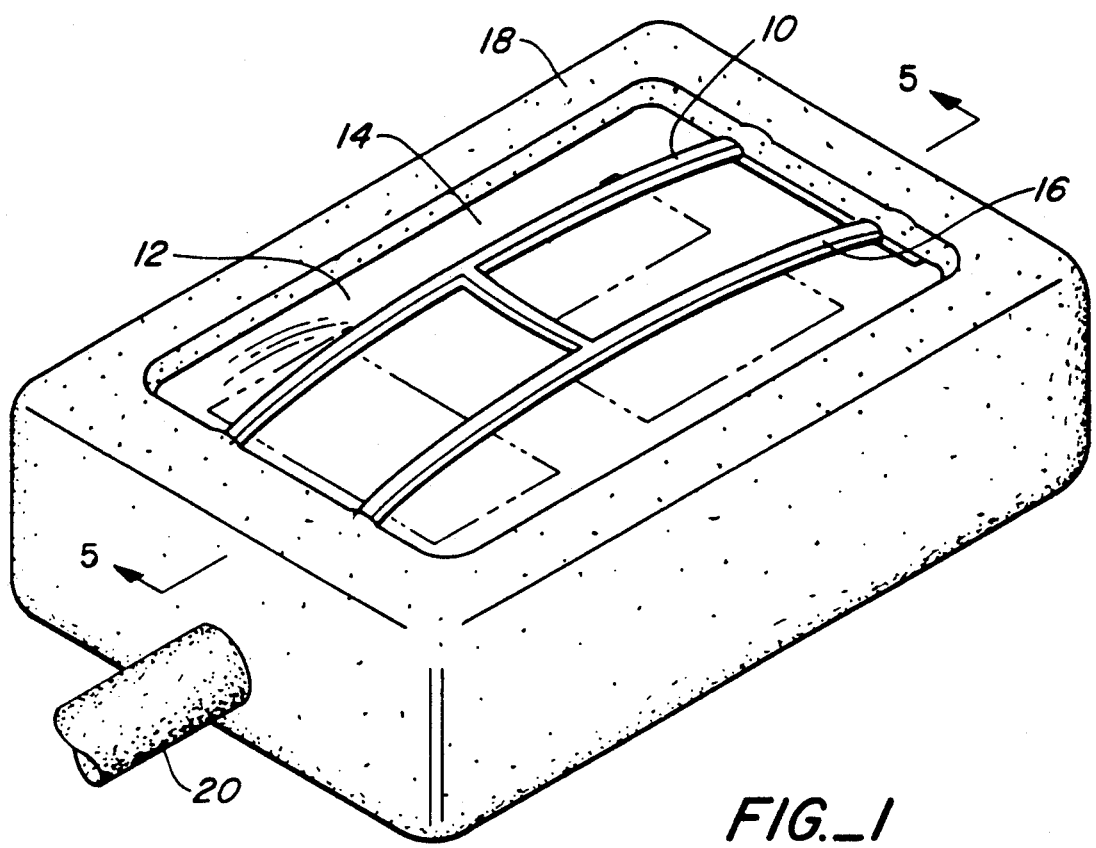
FIG._1
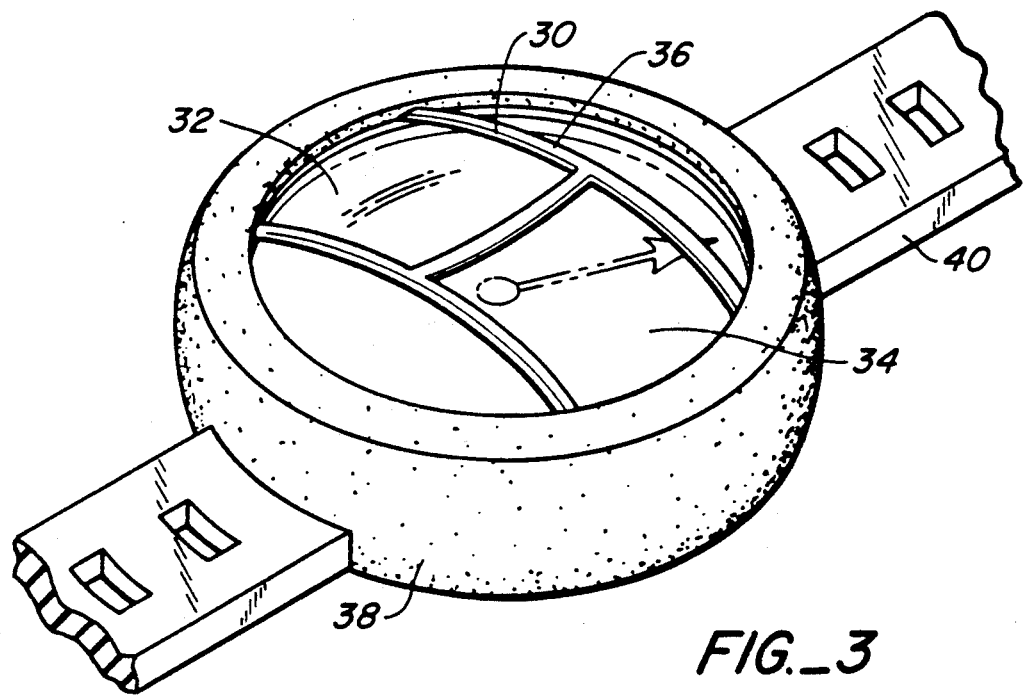
FIG._3

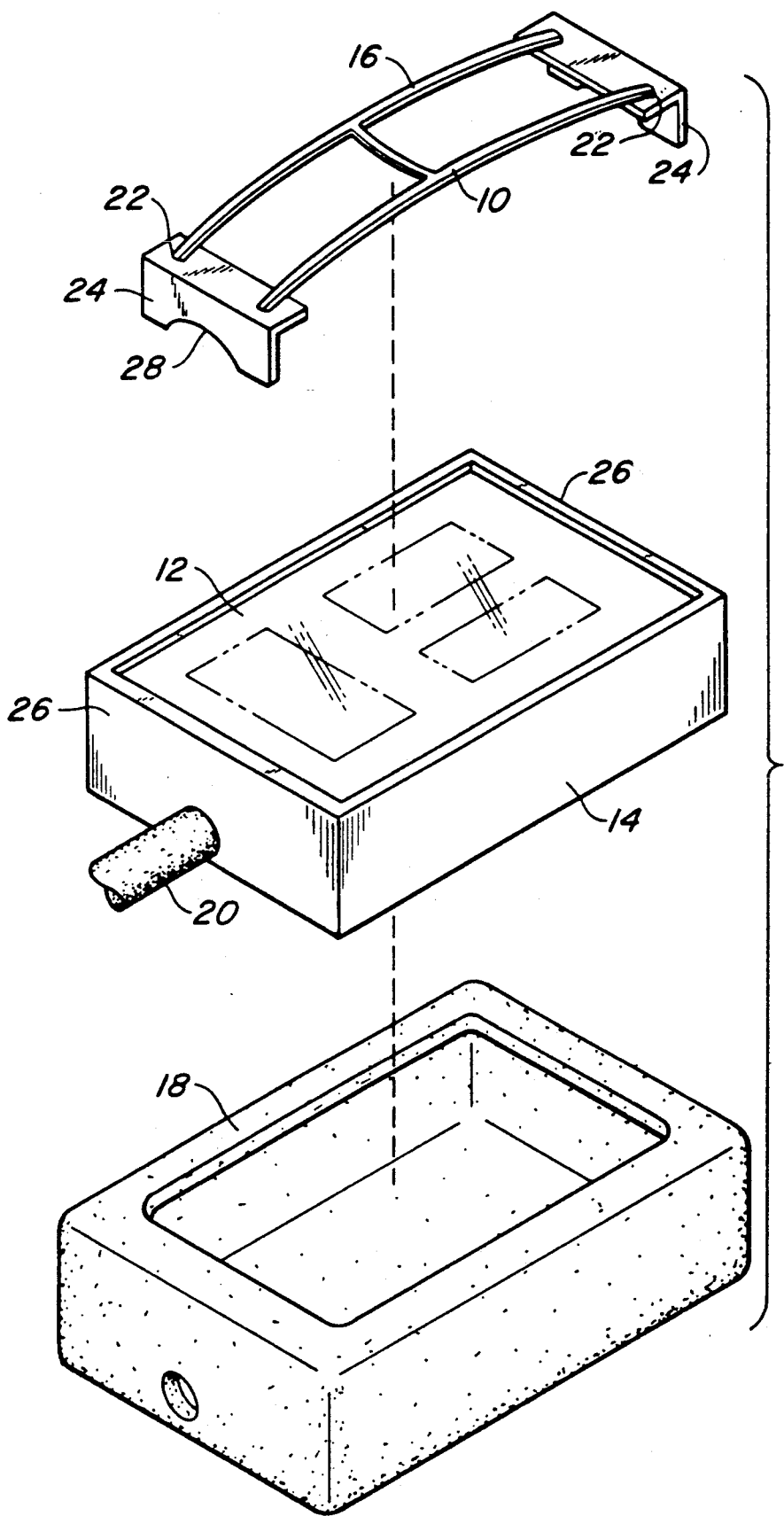
FIG._2

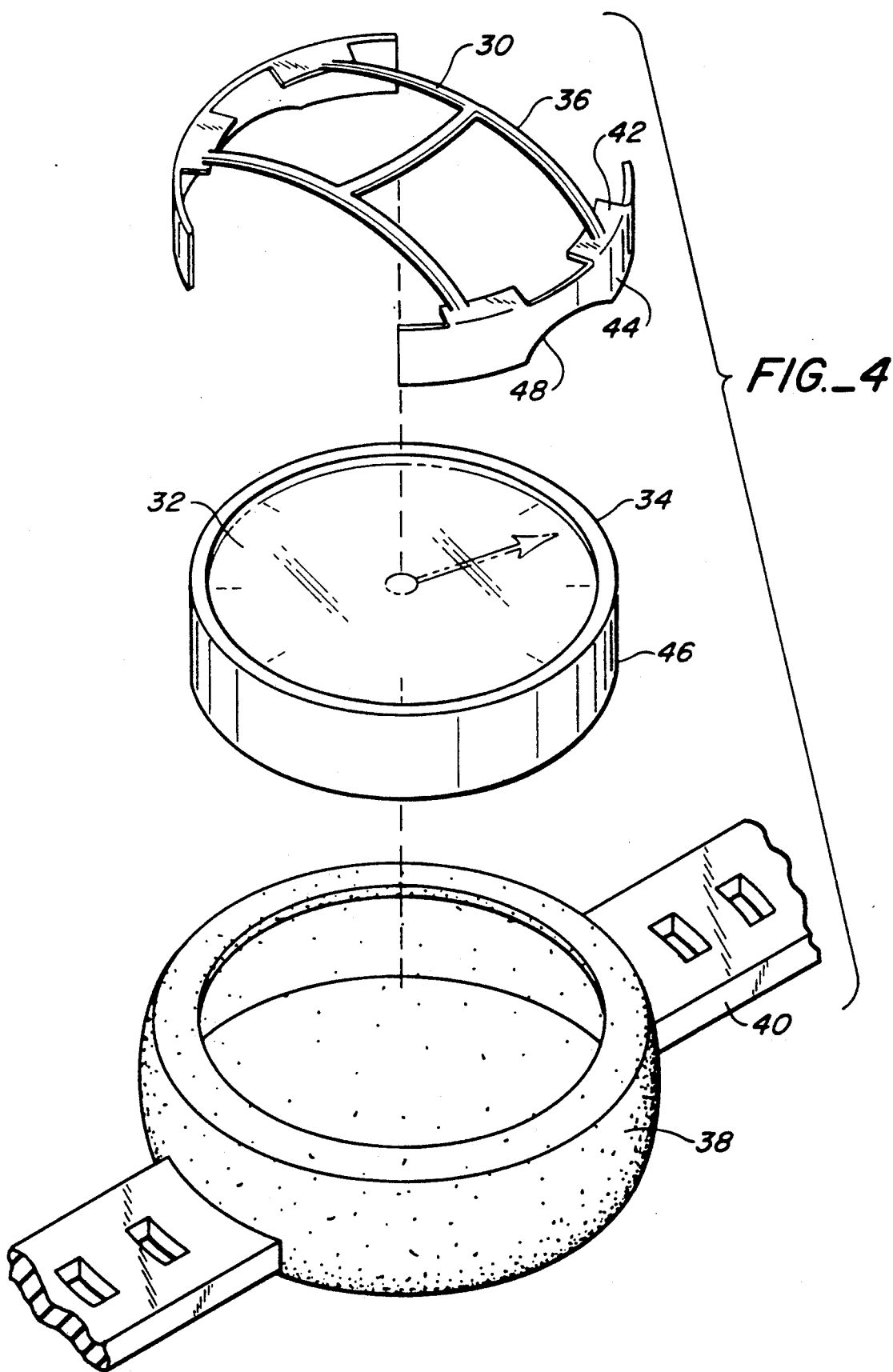
FIG._4

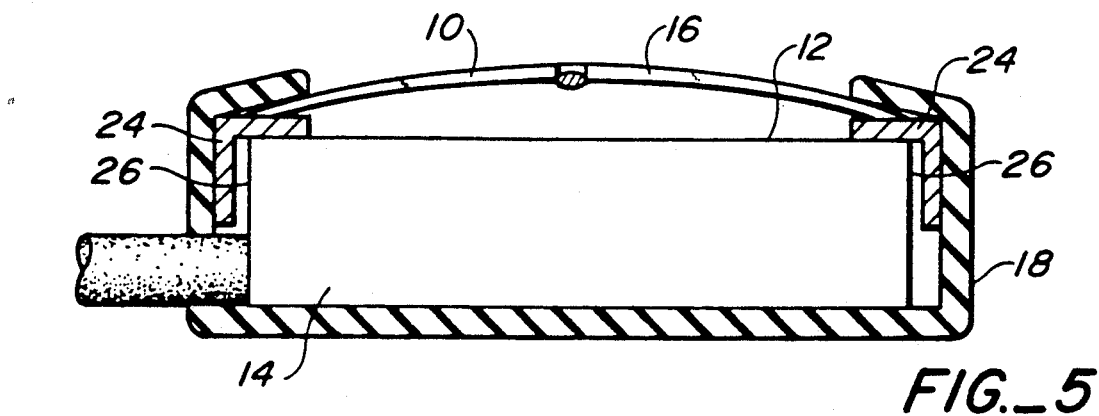
FIG._5
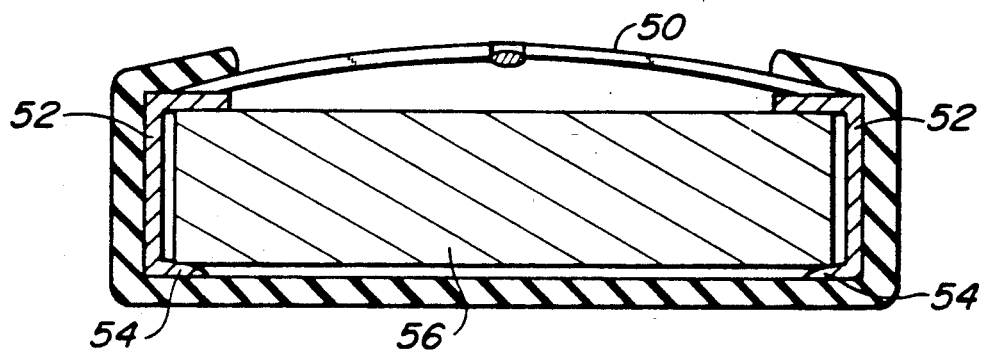
FIG._6
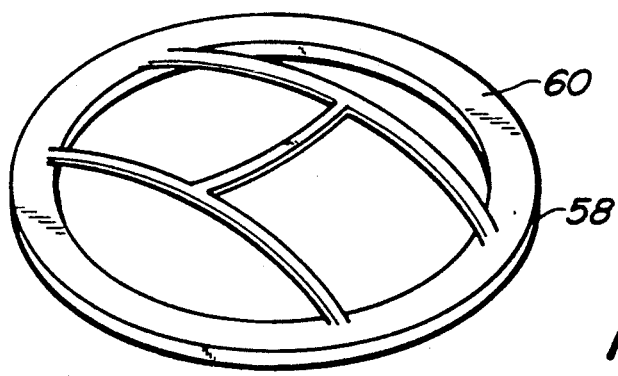
FIG._7
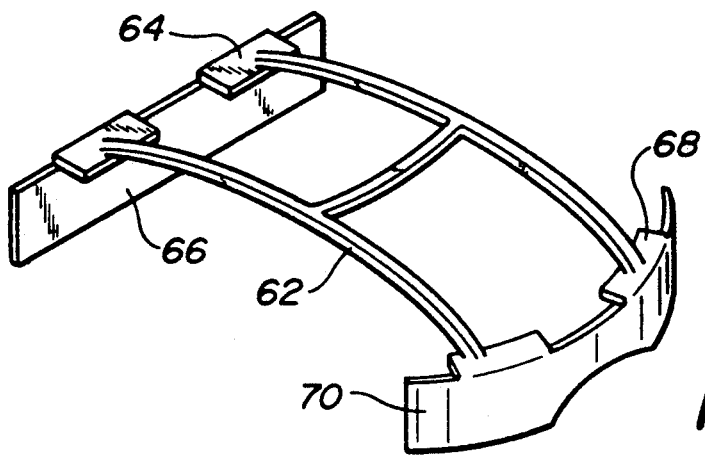
FIG._8

GAUGE PROTECTOR

BACKGROUND OF THE INVENTION

1. Field of the Invention

This invention relates generally to gauges, compasses, and related articles used in skin and scuba diving, and more specifically to an improved shield device for protection of the lenses of such articles.

2. Description of the Prior Art

Dive gauges and other instruments as used in the skin and scuba diving industry are well known. Many skin and scuba divers use a variety of such gauges, including pressure gauges (used to display the air pressure remaining in the compressed air tank), depth gauges (used to display the depth below the water surface), watches (used to display time, elapsed time, and the like), compasses (used to display magnetic north and associated bearings), and dive "computers" (which are programmable and used to display diving criteria such as decompression levels, times, and the like).

Most such dive gauges include a gauge body having a dial covered by a transparent lens or window, and may include a hose connecting the gauge body to some other component of the diving equipment (e.g., a pressure gauge is so connected to the compressed air tank to monitor remaining pressure). The gauge body is typically removably encased in a soft rubber or neoprene boot for protection, while leaving the lens uncovered for viewing by the diver. Unfortunately, the lens is therefore exposed and prone to scratching, etching, and other forms of abrasion, which obscures the transparency of the lens and thus reduces the ability of the diver to view the gauge dial. Although many such lenses are designed to be replaceable to remedy this problem, such replacement can be awkward, time-consuming and expensive.

SUMMARY OF THE INVENTION

The gauge protector of this invention provides a shield device for the protection of the lenses of skin diving gauges and related articles. The device comprises one or more crossbar elements extending between crossbar base portions, of a size and shape to fit over the gauge lens, and is releasably captured between the dive gauge body and its associated flexible protective boot member. The crossbar base portions preferably include downwardly-extending peripheral flange portions for releasable capture of the sides of the gauge body, which may themselves include notch portions to enable passage of a gauge hose or similar member.

BRIEF DESCRIPTION OF THE DRAWINGS

FIG. 1 is a perspective view of a rectangular configuration gauge protector of this invention as installed over the lens of a typical dive computer, so that the crossbar elements of the gauge protector shield the dive computer lens from contact and abrasion;

FIG. 2 is an exploded perspective view of the rectangular configuration gauge protector and typical dive computer of FIG. 1, illustrating the placement of the gauge protector over the dive computer body so that the gauge protector crossbar elements extend between the crossbar base portions to shield the dive computer lens, and the gauge protector peripheral flange portions releasably capture the sides of the dive computer body, and together fit within and are releasably captured by the dive computer boot member;

FIG. 3 is a perspective view of a round configuration gauge protector of this invention as installed over the lens of a typical dive compass, so that the crossbar elements of the gauge protector shield the compass lens from contact and abrasion;

FIG. 4 is an exploded perspective view of the round configuration gauge protector and typical dive compass of FIG. 3, illustrating the placement of the gauge protector over the dive compass body so that the gauge protector crossbar elements extend between the crossbar base portions to shield the dive compass lens, and the gauge protector peripheral flange portions releasably capture the sides of the dive compass body, and together fit within and are releasably captured by the dive compass boot member;

FIG. 5 is a side elevation cross-sectional view of the rectangular configuration gauge protector and typical dive computer of FIG. 1, this view taken along line 5—5 of FIG. 1, and illustrating the capture of the sides of the dive computer body by the gauge protector peripheral flange portions, and the capture of both by the dive computer boot member;

FIG. 6 is a side elevation cross-sectional view of a modified rectangular configuration gauge protector, illustrating each peripheral flange portion of the gauge protector further including a medially-extending tab portion;

FIG. 7 is a perspective view of a modified round configuration gauge protector, illustrating a contiguous circumferential crossbar base portion and eliminating the peripheral flange portions; and FIG. 8 is a perspective view of a hybrid rectangular/round configuration gauge protector of this invention.

DETAILED DESCRIPTION OF A PREFERRED EMBODIMENT

FIG. 1 is a perspective view of a rectangular configuration gauge protector 10 of this invention as installed over the lens 12 of a typical dive computer 14, so that the crossbar elements 16 of the gauge protector shield the dive computer lens from contact and abrasion. Dive computer 14 and gauge protector 10 are each releasably captured by protective boot member 18, which surrounds the body of the dive computer. Dive computer 14 may include a hose 20 extending to some other component of the diving equipment.

While any number of crossbar elements may be used, it is important not to unduly obstruct the diver's view of the gauge lens. It has been determined that a pair of lateral crossmembers connected by a single joining crossmember provides a desirable compromise between lens protection and lens visibility.

FIG. 2 is an exploded perspective view of the rectangular configuration gauge protector 10 and typical dive computer 14 of FIG. 1, illustrating the placement of the gauge protector over the dive computer body so that the gauge protector crossbar elements 16 extend between crossbar base portions 22 to shield the dive computer lens 12, and the gauge protector downwardly-extending peripheral flange portions 24 releasably capture the sides 26 of the dive computer body, and together fit within and are releasably captured by the dive computer boot member 18. The peripheral flange portions 24 may include arcuate notch portions 28 to accommodate passage of hose 20 when installed in the boot.

FIG. 3 is a perspective view of a round configuration gauge protector 30 of this invention as installed over the lens 32 of a typical dive compass 34, so that the crossbar elements 36 of the gauge protector shield the compass lens from contact and abrasion. Dive compass 34 and gauge protector 30 are each releasably captured by protective boot member 38, which surrounds the body of the dive compass. Boot 38 may itself be attached to strap member 40 for securing to a diver's wrist.

FIG. 4 is an exploded perspective view of the round configuration gauge protector 30 and typical dive compass 34 of FIG. 3, illustrating the placement of the gauge protector over the dive compass body so that the gauge protector crossbar elements 36 extend between the crossbar base portions 42 to shield the dive compass lens 32, and the gauge protector downwardly-extending peripheral flange portions 44 releasably capture the side(s) 46 of the dive compass body, and together fit within and are releasably captured by the dive compass boot member 38. The peripheral flange portions 44 may include arcuate notch portions 48 to accommodate passage of a hose or other article, as when used with a pressure gauge.

FIG. 5 is a side elevation cross-sectional view of the rectangular configuration gauge protector 10 and typical dive computer 14 of FIG. 1, this view taken along line 5—5 of FIG. 1, and illustrating the capture of the sides 26 of the dive computer body by the gauge protector peripheral flange portions 24, and the capture of both by the dive computer boot member 18. Dive computer lens 12 is thus shielded by crossbar elements 16. As illustrated in this view, the crossbar elements are preferably slightly curved in shape over the top of the lens to better protect the entire lens surface, while still being compact and unobtrusive.

FIG. 6 is a side elevation cross-sectional view of a modified rectangular configuration gauge protector 50, illustrating each peripheral flange portion 52 of the gauge protector further including a medially-extending tab portion 54. Inclusion of this tab portion supplements and enhances the secure capture of gauge body 56, and may be appropriate in certain applications.

FIG. 7 is a perspective view of a modified round configuration gauge protector 58, illustrating a contiguous circumferential crossbar base portion 60 and eliminating the peripheral flange portions. Absence of the peripheral flange portions is somewhat offset by the contiguous nature of the crossbar base portion, which is captured and stabilized between the gauge body and boot when installed.

FIG. 8 is a perspective view of a hybrid rectangular/round configuration gauge protector 62 of this invention, bearing a rectangular configuration-style (straight) crossbar base portion 64 and associated peripheral flange portion 66 on one side, and a round configuration-style (curved) crossbar base portion 68 and associated peripheral flange portion 70 on the other side. This hybrid arrangement is appropriate to accomodate some styles of gauges which themselves have one straight side and one curved side.

The gauge protector of this invention is preferably made of stainless steel or similar strong, non-corrosive material, which is preferably non-magnetic so as not to interfere with a compass (where appropriate). The gauge protector can of course be made in any size or shape to accomodate any specific gauge body.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A diving gauge lens protector to shield the transparent lens of a diving gauge having a gauge body bearing gauge body sides, said gauge body removably encased in a protective boot member, said diving gauge lens protector comprising:
   one or more crossbar elements of a size to extend across said diving gauge lens, said crossbar elements terminating in crossbar base portions on opposite sides of said diving gauge lens, said crossbar base portions include downwardly-extending peripheral flange portions, said peripheral flange portions conditioned for releasable capture between said gauge body sides and said protective boot member.

2. The diving gauge lens protector of claim 1 wherein at least one of said downwardly-extending peripheral flange portions includes a notch portion to enable passage of a hose member.

3. The diving gauge lens protector of claim 1 wherein said downwardly-extending peripheral flange portions are generally straight.

4. The diving gauge lens protector of claim 1 wherein said downwardly-extending peripheral flange portions are generally curved.

5. The diving gauge lens protector of claim 1 wherein said downwardly-extending peripheral flange portions further include medially-extending tab portions conditioned for further capture of said gauge body.

6. The diving gauge lens protector of claim 1 wherein said crossbar elements comprise a pair of lateral crossmembers connected by a single joining crossmember.

* * * * *